United States Patent [19]
Treichel et al.

[11] 3,764,183
[45] Oct. 9, 1973

[54] HYDRAULIC BRAKE ACTUATOR

[75] Inventors: Richard Treichel, Cedar Falls;
 Albert Anthony Obermeier,
 Waterloo; Paul Robert Schuck,
 Coralville, all of Iowa

[73] Assignee: Deere & Company, Moline, Ill.

[22] Filed: Dec. 27, 1971

[21] Appl. No.: 211,889

[52] U.S. Cl. .................................. 303/54, 60/52 B
[51] Int. Cl. ............................................. B60t 15/04
[58] Field of Search .................... 60/54.5 P, 52 B; 303/52, 54; 137/627.5

[56] References Cited
UNITED STATES PATENTS
2,484,888 10/1949 Hollerith ........................ 303/54 X
3,317,252 5/1967 Gassman .............................. 303/54

Primary Examiner—Duane A. Reger
Attorney—H. V. Harsha et al.

[57] ABSTRACT

A hydraulic brake actuator is capable of effecting both power and manual actuation of a brake. The brake actuator includes a valve spool which is normally selectively shiftable to connect a primary fluid pressure source to effect power actuation of the brake. The brake actuator also includes a two-stage master cylinder means which is manually shiftable, by the same linkage used for shifting the spool valve, for generating and supplying an alternate source of fluid pressure to the brake to effect manual actuation thereof upon failure of the primary fluid pressure source.

5 Claims, 3 Drawing Figures

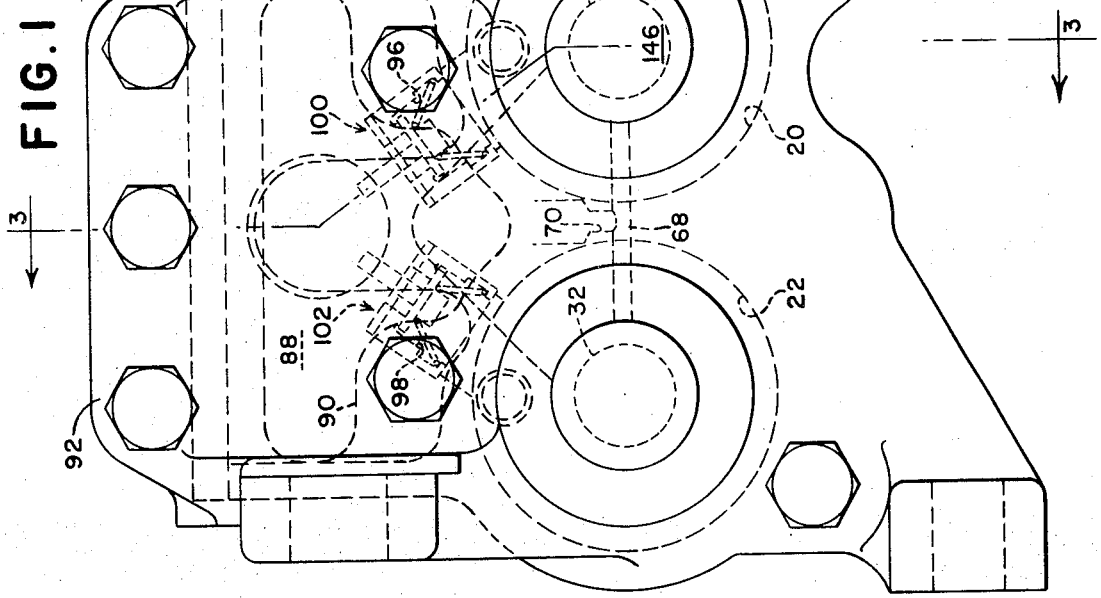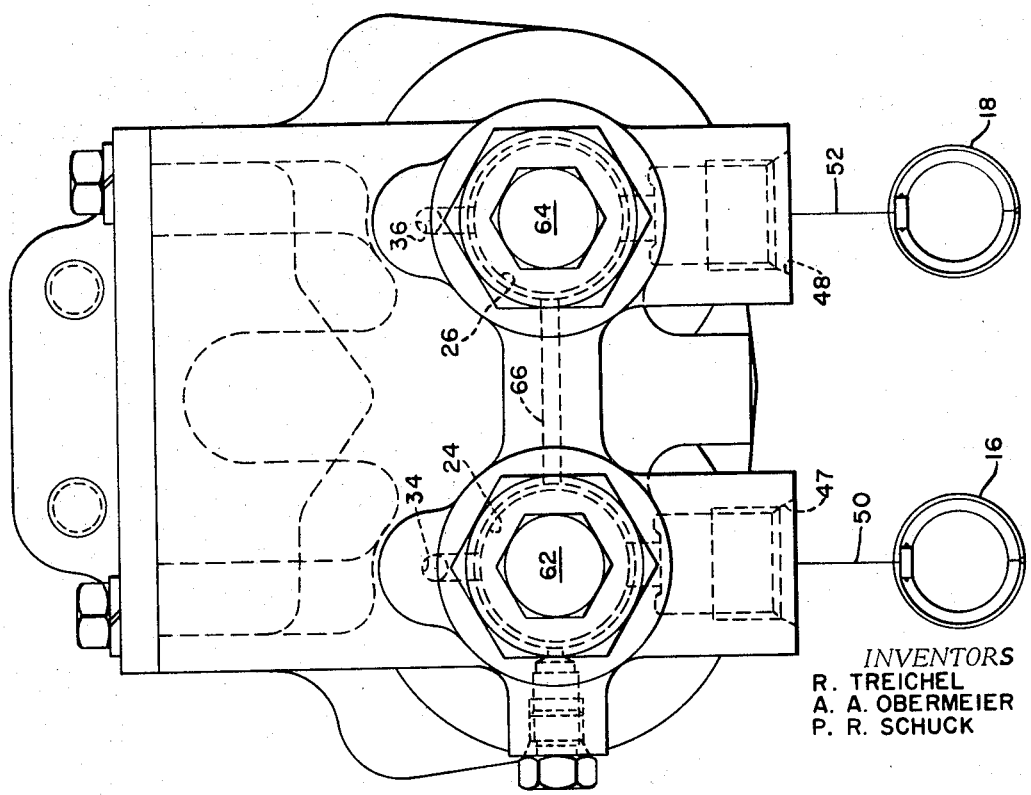

INVENTORS
R. TREICHEL
A. A. OBERMEIER
P. R. SCHUCK

HYDRAULIC BRAKE ACTUATOR

BACKGROUND OF THE INVENTION

The present invention relates to a hydraulic brake actuator of the type capable of effecting both power and manual actuation of a brake and more particularly relates to a brake actuator including a valve, which is shiftable to connect a primary pressure source to a brake, and a master cylinder means, which is shiftable to generate and connect a secondary pressure source to the brake upon failure of the primary source.

Known brake actuators of the above-described type are not entirely satisfactory since in the manual mode adequate braking can be attained only by "pumping" the master cylinder means or by using an auxiliary power source such as an accumulator to build up the pressure in the brake lines. Also in the known brake actuators, the entire manual operation is accomplished by overtravelling the brake pedal linkage from its normal power brake operation, thus requiring relatively long brake pedal travel. A further undesirable characteristic of the known actuators is that they do not provide smooth and rapid buildup and release of brake pressure.

SUMMARY OF THE INVENTION

Accordingly, there is provided a new and novel brake actuator for obviating the above-described difficulties and problems encountered with conventional hydraulic brake actuators.

It is an object of the invention to provide a brake actuator having, for the purpose of manual brake actuation, a master cylinder means at least partially actuatable by normal travel of the brake pedal linkage. A more specific object is to provide such an actuator with a master cylinder means comprising a prefill piston, shiftable by normal travel of the brake linkage for filling the brake lines with fluid, and an override piston, shiftable by overtravel of the brake pedal linkage to complete brake actuation.

Another object of the invention is to provide an actuator having a spool valve for selectively connecting the primary source of fluid pressure to the brakes, the spool valve being located in a bore extending axially through the aforementioned override piston; and the spool valve and override piston having passages and ports related so as to control pressure spikes and improve the release characteristics of the brakes during power operation.

Still another object is to provide an actuator having an unloading check valve located in a bore extending axially through the aforementioned prefill piston, to relieve excess fluid pressure from in front of the prefill piston during manual actuation of the brakes.

A further object is to provide an actuator wherein valve and piston elements are advantageously arranged in axial alignment such that operating and feedback forces act in direct opposition to each other to enhance the modulating characteristics of the actuator.

These and other objects will be apparent from the ensuing description and the appended drawings.

BRIEF DESCRIPTION OF THE DRAWINGS

FIG. 1 is an end view of a hydraulic brake actuator assembly embodying a pair of actuators constructed according to the present invention.

FIG. 2 is a view of the opposite end of the actuator shown in FIG. 1.

DESCRIPTION OF THE PREFERRED EMBODIMENT

Figure 3:
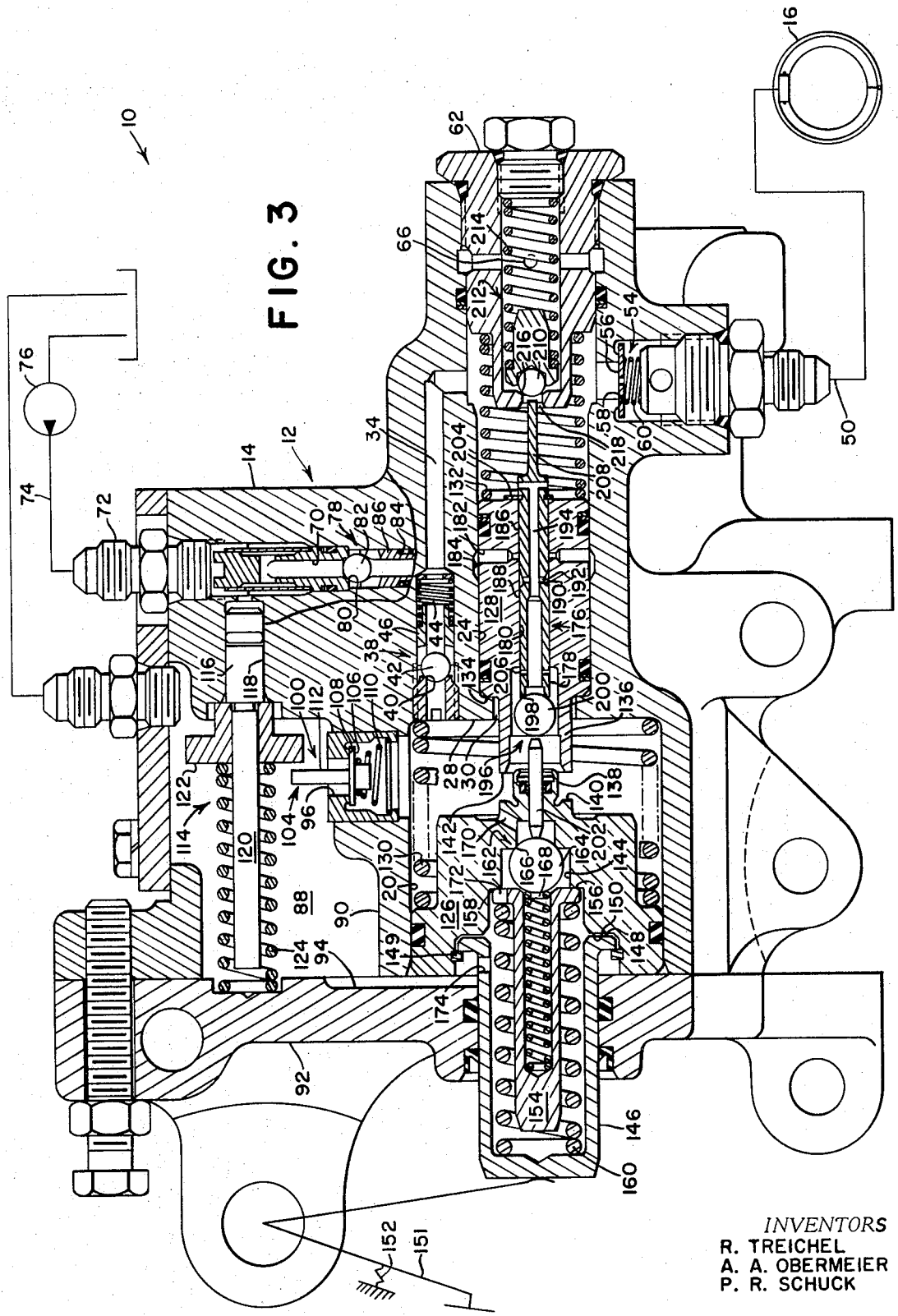
FIG. 3 is a longitudinal sectional view of the actuator assembly taken along line 3—3 in FIG. 2, but with portions being broken away to expose certain valve structure.

Referring now to the drawings, a hydraulic brake actuator system is indicated generally at 10. The system 10 includes a brake actuator assembly 12 comprising a housing or body 14, which is adapted to be affixed in the vicinity of an operator's station with that end shown in FIG. 1, hereinafter referred to as the rearward end, being disposed so as to face the operator. The housing 14 comprises structure for operatively containing right and left brake actuator components for respectively actuating right and left vehicle brakes, shown schematically respectively at 16 and 18, either separately or together. Specifically, as viewed in FIG. 1, the housing 14 affords right and left cylindrical prefill chambers 20 and 22 respectively located rearwardly of and in axial alignment with right and left cylindrical high-pressure chambers 24 and 26. The chambers 20 and 22 are separated from the chambers 24 and 26 by a partition wall 28 and extending through the wall 28 respectively in axial alignment with and interconnecting the right chambers 20 and 24 and interconnecting the left chambers 22 and 26 are a pair of openings 30 and 32. Separate from the openings 30 and 32 but also passing through the wall 28 are right and left filling passages 34 and 36, respectively, connecting the chamber 20 with a forward location of the chamber 24 and connecting the chamber 22 with a forward location of the chamber 26. Right and left one-way reservoir check valves are respectively located in the filling passages 34 and 36, only the right check valve 38 being illustrated. The check valve 38 comprises a forwardly facing valve seat 40 towards which a check ball 42 is biased through means of a spring 44 acting on a valve section member 46. The check ball 42 is normally seated, as shown in FIG. 3, and allows flow through the filling passage 34 only when the fluid pressure in the prefill chamber 20 exceeds the combined force exerted on the ball 42 by the spring 44 and the fluid pressure in the high-pressure chamber 24.

Also connected to forward locations of the right and left high-pressure chambers 24 and 26 are right and left brake fluid supply outlets 47 and 48, respectively. The outlets 47 and 48 are respectively connected to the right and left brakes 16 and 18 by means of brake lines 50 and 52. Right and left one-way restrictor valves are respectively located in the outlets 47 and 48, only the right restrictor valve 54 being illustrated. The valve 54 comprises an apertured disc 56 biased upwardly toward a seat 58 by means of a spring 60. The disc 56 is forced off its seat to allow unrestricted flow to the brake line 50 when the right brake is being engaged and the aperture in the disc 56 acts to restrict the return of brake fluid from the brake line 50 when the right brake is being released. The purpose of the restrictor valve 54 is more fully explained below.

The forward ends of the high-pressure chambers 24 and 26 are respectively closed by right and left hollow plugs 62 and 64. The interiors of the hollow plugs 62 and 64 are interconnected by a passage means 66, best seen in FIGS. 2 and 3, for conveying fluid for maintaining equal pressure in the high-pressure chambers 24 and 26, when the right and left brakes 16 and 18 are being simultaneously engaged.

Interconnecting the high-pressure chambers 24 and 26 at respective locations intermediate of their ends is a cross-passage 68 to the middle of which is connected a vertical inlet passage 70. At the upper end of the passage 70 is an inlet connection 72, which is connected via a feed line 74 to a primary fluid pressure source shown here as a pump 76. While the pump 76 is shown connected only to the actuator assembly 12, it is to be understood that the pump 76 may also be used to supply fluid to other hydraulic functions. An inlet check valve 78 is located in the bottom portion of the inlet passage 70 and includes a downwardly facing valve seat 80 towards which a check ball 82 is biased by means of a spring 84 acting on a valve-seating member 86. The ball 82 is normally seated to isolate the actuator assembly from the remainder of the system 10 when there is a failure in the system which results in insufficient fluid pressure being available to the inlet passage 70 for actuation of the brakes.

A fluid reservoir 88 is centered in the housing 14 above the right and left prefill chambers 20 and 22 and is separated therefrom by a partition wall 90. The housing 14 includes a rear end plate 92 which serves as the rear wall of the reservoir 88 and closes the rear ends of the prefill chambers 20 and 22. A recess 94 in the forward face of the plate 92 fluid-connects the reservoir 88 with the rearward ends of the chambers 20 and 22. The chambers 20 and 22 are further respectively connected to the reservoir 88 by right and left openings 96 and 98 extending through the partition wall 90. The flow of fluid through the openings 96 and 98 is respectively controlled by right and left pilot-operated, reservoir-isolating valves 100 and 102. The valves 100 and 102 each comprise a valve member 104 including a disc 106, biased upwardly towards a seat 108 by a spring 110, and a stem 112 integral with and projecting upwardly from the disc into the reservoir 88. Thus, the discs 106 are normally seated, as shown in FIG. 3, to prevent flow through the openings 96 and 98. A valve-actuating mechanism 114 is provided for unseating the discs 106 in response to there being sufficient fluid pressure in the inlet passage 70 for brake actuation. Specifically, the valve-actuating mechanism 114 comprises a pilot piston 116 slidably mounted in a bore 118 located centrally in the housing 14, the forward end of the bore being fluid-connected to the inlet passage 70 and the rearward end of the bore opening into the reservoir 88. Integral with and projecting rearwardly from the piston 116 into the reservoir 88 is a rod 120 on which a valve-engaging collar 122 is slidably mounted. A coil spring 124 encircles the rod 120 and is compressed between the inner face of the end plate 92 and the collar 122 and biases the collar against the piston 116. The stems 112 of the valves 100 and 102 are located in the path of rearward movement of the collar 122 and it can thus be seen that the piston 116 will shift rearwardly to engage the collar 122 with the stems 112 and tilt the discs 106 off their respective seats when fluid pressure enters the inlet passage 70. When the discs 106 are unseated, the prefill chambers 20 and 22 are fluid-connected to and are in essence part of the reservoir 88.

It is here noted that during normal operation sufficient brake-operating fluid pressure will be delivered to the inlet passage 70 to open the inlet valve 78 and cause the valve-actuating mechanism 114 to open the valves 100 and 102 to establish a power mode condition in the actuator assembly 12 wherein inlet pressure fluid may be selectively connected to one or the other or to both of the brakes 16 and 18. When there is a system failure resulting in insufficient fluid pressure being delivered to the inlet passage 70 for adequate brake actuation, the valves 78, 100 and 102 close to automatically establish a manual mode condition in the actuator assembly 12 wherein fluid pressure is selectively manually generated within the assembly 12 and connected to one or the other or to both of the brakes 16 and 18.

The description appearing hereinafter is directed mainly to those components of the actuator assembly 12 which are necessary for the actuation of the right brake 16 and it is to be understood that corresponding components exist for actuating the left brake 18.

Referring then to FIG. 3, there is shown the various actuator components for actuating the right brake 16 both in the power and manual modes of the assembly 10. Specifically, respectively slidably received in the right prefill chamber 20 and in the right high-pressure chambers 24 are a prefill piston 126 and an override piston 128, the pistons 126 and 128 respectively comprising the first and second stages of a two-stage master cylinder assembly for generating fluid pressure for actuating the right brake 16, when the actuator assembly 12 is in the condition for operation in the manual mode. A coil spring 130 is compressed between the partition wall 28 and the prefill piston 126 and urges the piston toward a starting or released position wherein the rearward end of the piston abuts the end plate 92, as shown in FIG. 3. Similarly, a coil spring 132 is compressed between the plug 62 and the override piston 128 and urges the piston toward a starting or released position wherein a rearwardly facing shoulder 134, intermediate the ends of the piston, abuts the partition wall 28, as shown in FIG. 3. The override piston 128 includes a tubular receptacle 136, which is contiguous with the shoulder 134 and extends rearwardly through the opening 30 into the prefill chamber 20. The receptacle 136 is adapted to receive a nose 138, forming the forward end of the prefill piston 126, and a pair of annular complementary abutment or sealing surfaces 140 and 142 are respectively located at the base of the nose 138 and at the rearward end of the receptacle 136 for sealing engagement with each other when the prefill piston 126 is shifted forwardly in the chamber 20.

A bore 144 extends axially through the prefill piston 126 and is sequentially stepped axially inwardly from the rearward to the forward end of the piston to form a five different diameter portions. A valve plunger 146 is shiftably mounted in the housing end plate 92 in axial alignment with the piston 126. The plunger 146 and the piston 126 are interconnected for unitary movement and for this purpose the forward end of the plunger is flared radially outwardly in the form of a flange 148, which is captively held in the largest portion of the bore 144 between a snap ring 149 and a rearwardly facing surface 150 joining the largest and the next to the largest portions of the bore 144. The plunger 146 is cup-like with its closed end extending rearwardly for engagement by a schematically shown right brake pedal linkage 151 for selectively shifting the plunger forwardly. The linkage 151 is shown held in a fully released position by a return spring 152. Extending into the open forward end of the plunger 146 is a similarly-shaped but smaller spring retainer 154 having a forward flange 156 positioned for engaging a rearwardly facing surface 158 joining the second and the third to the largest portions of the bore 144. A pressure-modulating spring 160 is compressed between the inner rearward end of the plunger 146 and the flange 156 and biases the retainer 154 toward the surface 158. Located in the middle-sized portion of the bore 144 is a prefill chamber unloading valve 162 comprising a check ball 164 biased forwardly toward an annular seat 166 at the rearward end of the next to the smallest bore portion by a coil spring 168 compressed between the inner rearward end of the retainer 154 and the ball. An angled passage 170 in the forward end of the prefill piston 126 fluid-connects the chamber 20 with the bore 144 forwardly of the check ball 164. The check ball 164 is normally seated, but during manual mode operation the ball is unseated, in a manner described below, by a combination of the prefill and override chamber pressures to unload the prefill chamber 20 to the reservoir 88, it being noted that openings 172 and 174 are respectively located in the retainer flange 156 and the wall of the plunger 146 for permitting the passage of unloaded fluid therethrough.

The override piston 128 serves as the body for a brake control valve 176 including a valve spool 178 slidably received in a valve bore 180 extending axially through the piston 128. Inlet fluid is conveyed to the bore 180 by means of inlet fluid metering orifices 182 extending radially in the piston 128 between the bore 180 and the outer surface of the piston. When the piston 128 is in the starting or released position shown, the orifices 182 register with an annular groove 184 in the chamber 26 into which opens one end of the cross-passage 68. Inlet fluid pressure is thus connected to the bore 180. For the purpose of controlling the passage of inlet fluid from the bore 180 to the high-pressure chamber 24, the valve spool 178 includes forward and rearward lands 186 and 188, respectively, separated by an annular groove 190. The groove 190 is fluid-connected, via radial ports 192, to a fluid passage 194 extending axially in the spool 178 from the rearward end thereof to a location forwardly of the piston 128 whereat the passage 194 branches radially to the surface of the forward land 186. The land 186 normally blocks the inlet fluid metering orifices 182 to prevent inlet fluid from entering the passage 194 when the prefill piston 126 is in the released position shown. Also, when the piston 126 is in the released position, the passage 194 is normally open to permit the return of brake-operating fluid to the prefill chamber 20. The passage 194 is closed by a reservoir shut-off valve 196 when the prefill piston 126 is shifted forwardly a predetermined distance. The valve 196 comprises a valve seat 198, annularly disposed about the open rearward end of the passage 194, and a check ball 200 located rearwardly of the seat 198 in the receptacle 136. A valve-seating pin 202 is slidably mounted in the smallest portion of the prefill piston bore 144 in the piston nose 138 and the opposite ends of the pin 202 are disposed for engagement with the check balls 164 and 200. Thus, after predetermined starting clearances have been closed by forward shifting of the prefill piston 126, the pin 202 engages and seats the ball 200 to close the passage 194 and isolate the prefill chamber 20 from the high-pressure chamber 24. To ensure that these starting clearances are maintained, a snap ring 204 is mounted on the forward land 186 of the valve spool so as to engage the forward end of the override piston 128 and limit the rearward movement of the spool 178. After the check ball 200 is seated, further forward movement of the piston 126 is transferred directly to the valve spool 178 to shift the latter to an operative position wherein the groove 190 is registered with the orifices 182 to connect inlet fluid pressure to the high-pressure chamber 24 and hence to the right brake 16 via the brake line 50. As soon as the snap ring 204 is shifted away from contact with the override piston 128, the fluid pressure in the chamber 24 acts on the front end of the spool 178 to force the latter rearwardly to maintain the valve seat 198 tightly engaged with the ball 200, it being noted that the effective area of the spool exposed to fluid pressure in the high-pressure chamber 24 is greater than the area of the ball 200 exposed to the same pressure. This rearward force is also transmitted to the pressure-modulating spring 160 and whenever the rearward force acting on the spring 160 is equal to the force generated on the brake valve plunger 146 by the brake pedal linkage 151, the spool 178 is shifted rearwardly by a further pressure rise to shut off the inlet fluid-metering orifices 182. If the pedal linkage 151 is actuated to increase the force applied to the plunger 146, the spool 178 will again shift forwardly to open the orifices 182. Located in the rearward land 188 of the spool 178 are return fluid-metering orifices 206, which extend radially between the passage 194 and the exterior of the spool 178. The orifices 206 improve the release characteristics of the right brake actuator by allowing brake-actuating pressure fluid to be slowly released to the prefill chamber 20 first through the clearance between the spool 178 and the valve bore 180 in increasing amounts as the orifices 206 approach the rearward end of the bore 180 and then through the receptacle 136.

It is here noted that the forward end of the spool 178 comprises a stem 208 which is positioned for engaging and unseating a check ball 210 of an equalizing valve 212, the ball 210 being biased by a spring 214 toward a valve seat 216 located on the forward side of an opening 218 leading to the interior of the plug 62. When the right and left brakes 16 and 18 are simultaneously actuated, the ball 210 and the corresponding ball of the left brake actuator means are both unseated so as to provide a fluid path joining the right and left high-pressure chambers 24 and 26 so that the right and left brakes' operating fluid pressures are equalized.

Ignoring for the most part the operation of the components for actuating the left brake 18, the operation of the actuator assembly 12 is as follows. When the right brake pedal linkage 151 is in the released condition shown, the valve plunger and the actuator components in axial alignment therewith will occupy the starting or released positions, shown in FIG. 3. Assuming that the pump 76 is operative to deliver a primary source of fluid pressure to the inlet passage 70, the inlet check valve ball 82 will be held off its seat and the cross-passage 68, the groove 184 and the inlet fluid-metering orifices 182 will all contain inlet pressure fluid, it being noted that the valve spool 178 will block the inner ends of the orifices 182, as shown. The pressure in the inlet passage 70 will also act to hold the pilot piston 116 in a rearwardly shifted position whereat the collar 122 is in engagement with the stem 112 of the valve 104 and holds the disc 106 in a tilted, unseated position to, in effect, make the prefill chamber 20 part of the reservoir 88. Also, the ball 200 of the reservoir shut-off valve 196 is unseated to permit fluid to flow from high-pressure chamber 24 to the chamber 20 via the passage 194. Thus, the right brake fluid line 50 is connected to the reservoir 88 and the right brake 16 is disengaged.

To cause engagement of the right brake 16, the right brake pedal linkage 151 is actuated to cause the plunger 146 and, hence, the prefill piston 126 to be shifted forwardly in the chamber 20. Initial forward movement of the plunger and piston engages the valve-seating pin 202 with the check ball 200 to seat the latter and block the rearward end of the passage 194. Continued forward movement of the plunger 146 then results in the valve spool 178 being shifted forwardly to bring the annular groove 190 into register with the inlet fluid-metering orifices 182. The orifices 182 are then unblocked and fluid is metered therethrough to the chamber 24 via a path comprising the ports 192 and the passage 194. The pressure in the chamber 24 acts to unseat the disc 56 of the restrictor valve 54 and then the pressure quickly but relatively gradually builds up in the right brake line 50 to cause the right brake 16 to become engaged. The brake-actuating fluid pressure rises until the force exerted thereby on the forward end of the valve spool 178 is equal to the force applied to the rearward end of the valve spool by the pressure-modulating spring 160 acting through the prefill chamber unloading valve check ball 164, the pin 202 and the reservoir shut-off valve check ball 200. A further rise in pressure then moves the spool 178 rearwardly to gradually block off the inlet fluid-metering orifices 182. If it is desired to increase the brake-applying pressure, the brake pedal linkage 151 is actuated to force the plunger 146 still further forwardly to again move the spool 178 to unblock the orifices 182. It is to be noted that maximum brake pressure will be realized when the sealing surface 140 of the prefill piston 126 contacts the sealing surface 142 of the override piston 128. The right brake 16 may be released by merely releasing the right brake pedal linkage 151. This permits the prefill and override pistons 126 and 128 to be returned to their rearward starting positions by the action of the respective springs 130 and 132. As the actuator components rearwardly of the valve spool 178 return to the starting positions, the fluid pressure acting on the forward end of the spool acts to move the spool rearwardly in the bore to gradually shut off the flow of inlet fluid through the orifices 182 and simultaneously gradually increase the amount of return fluid metered through the metering orifices 206 and the clearance between the valve spool 178 and the bore 180. When the fluid pressure in the high-pressure chamber 24 begins to drop, the apertured disc 56 of the restrictor valve 54 becomes seated and the aperture in the disc 56 and the orifices 206 then work in conjunction to smoothly release the brake line pressure. When the valve spool 178 has moved rearwardly far enough to bring the snap ring 204 into contact with the piston 128, the fluid pressure in the passage 194 moves the ball 200 off the seat 198 to release the pressure then remaining in the right brake line 50.

When the pump 76 becomes inoperative or fluid inlet pressure in the inlet passage 70 for any reason falls below that necessary for adequate braking, the actuator assembly 12 automatically assumes its manual operating mode condition. Specifically, the inlet valve 78 closes to isolate the actuator assembly 12 from the remainder of the system 10 and the pilot piston 116 shifts forwardly to permit the spring 124 to disengage the collar 122 from the stems 112 of the valves 100 and 102 to permit the valve discs 106 to be seated by the springs 110 to isolate the prefill chambers 20 and 22 from the reservoir 88. Assuming that the brake pedal linkage 51 is in the released condition shown in FIG. 3, the right brake 16 will be released as described above relative to operation of the assembly 12 in the power mode.

If it is desired to cause engagement of the right brake 16, the pedal linkage 151 is actuated to shift the valve plunger 146, the prefill piston 126, and the actuator components associated therewith, forwardly in the chamber 20. The valve-seating pin 202 is again shifted forwardly as described above to close the reservoir shut-off valve 196 for preventing the flow of fluid between the chambers 20 and 24 through the passage 194. Since there is little or no pressure in the chamber 24, the forward movement of the prefill piston quickly generates enough pressure for opening the valve 38 in the right filling passage 34 and fluid thus passes through the passage 34 to the chamber 24 and from there passes to the right brake line 50. Fluid continues to flow through the passage 34 until the line 50 has been filled to a predetermined prefill pressure. The unloading valve 162 then opens to vent excess fluid from the chamber 20 to the reservoir 88 and the valve 38 simultaneously closes. The force acting to open the valve 162 is derived from three sources, namely from the prefill and override chambers 20 and 24 and from the equalizer valve spring 214, it being noted that the valve spool stem 208 is in a forward shifted position against the equalizer valve ball 210. The fact that the unloading valve 162 senses and is responsive to both prefill and override chamber pressure is important since (a) there would not be a smooth transition in pedal linkage force during unloading if the unloading valve were not directly subject to prefill chamber force and (b) a residual pressure equal to the pressure necessary to open the unloading valve would remain in the prefill chamber and resist pedal effort during operation to complete the engagement of the brake 16 if the brake line pressure were not sensed by the unloading valve.

The prefill piston 126 has by this time travelled sufficiently to bring its sealing surface 140 into contact with the sealing surface 142 of the override piston 128 to positively prevent the interchange of fluid between the chambers 20 and 24. Up to this time, the brake pedal linkage 151 has been travelled only as far as it is travelled during power operation. The linkage 151 is then overtravelled to shift the piston 128 forwardly to cause the pressure in the brake line 50 to be increased to the desired braking pressure. Release of the brake pedal linkage 151 to disengage the brake 16 results in brake line fluid being returned to the prefill chamber via the passage 194 once the override piston 128 returns to its starting position and the shut-off valve 196 opens. The prefill chamber 20 is thus partially refilled with fluid for the next brake application. The remainder of the prefill chamber 20 is filled with fluid from the reservoir 88, which fluid passes through the opening 96 when the valve 100 opens as a result of a partial vacuum being created in the chamber 20 by the rearward movement of the released prefill piston 126. As mentioned above relative to power operation, the release of brake line pressure is slightly restricted by the one-way restrictor valve 54. This function is important not only for aiding in the smooth release of brake pressure but also for permitting the brake pressure to be increased by pumping the brake pedal linkage 151. Thus, if the pedal linkage 151 is immediately depressed to again force the actuator components forwardly in the chambers 20 and 24 before the brake line pressure is completely relieved, the override piston 128 will act to increase the brake line pressure above the amount attained by the original application of the brake linkage.

We claim:

1. A hydraulic power brake system, comprising: a source of fluid under pressure; a reservoir; a vehicle brake; a valve body having a bore therein intersected by inlet fluid metering orifice means; fluid conveying means connecting said source to said orifice means; said bore having forward and rearward open ends and first and second fluid cavities being respectively located at the rearward and forward ends of said bore; fluid connection means for establishing constant fluid communication between said first cavity and said reservoir when fluid pressure exists at said orifice means; said second cavity being connected in constant fluid communication with said vehicle brake; a valve spool being axially shiftably mounted in said bore and having fluid passage means therein including first, second and third interconnected openings; said first opening being in constant fluid communication with said second cavity, said second opening registering with said orifice means only when said spool is in a shifted active position for directing fluid pressure to said brake and said third opening being in fluid communication with said first cavity when said spool is in a released normal position for directing return fluid from said brake to said reservoir; actuator means for selectively engaging and shifting said spool from said normal to said active position and including a reservoir shut-off valve means operable for blocking fluid communication between said third opening and said first cavity when said actuating means is in shifting engagement with said spool.

2. The invention defined in claim 1 wherein said fluid passage means includes return fluid metering orifices located so as to be in direct fluid communication with said first cavity when said spool is in said normal position and blocked by said bore when the spool is shifted from the normal position, the return fluid metering orifices then acting to meter fluid to said first cavity through the clearance between said spool and bore whereby the brake-applying pressure is smoothly released when said actuating means is released to permit the spool to return to its normal position.

3. The invention defined in claim 1 wherein said first and second cavities are generally cylindrical and are in axial alignment; said valve body being an override piston shiftably mounted in said second cavity; first biasing means urging said override piston rearwardly toward a normal released position in engagement with a partition wall separating said cavities; said actuating means including a prefill piston shiftably mounted in said first cavity; second biasing means urging said prefill piston rearwardly toward a normal released position in engagement with an abutment in said first cavity; an opening through said partition wall in axial alignment with and joining said cavities; said pistons including opposed surfaces disposed such that the forward end of said prefill piston contacts said override piston when said actuator means has been moved through a normal movement sufficient for placing said spool in said active position, and for shifting said override piston from its released position when the actuator means is overtravelled past the normal movement; a pilot-operated reservoir isolating valve means in a first passage interconnecting said first cavity and reservoir and being responsive to inlet fluid pressure for assuming a normal open position interconnecting the reservoir and first cavity when the fluid pressure is adequate for brake operation and for assuming a closed position isolating the reservoir from the first cavity when the fluid pressure is inadequate for brake operation; a filling passage interconnecting said first and second cavities at respective locations spaced from the pistons in the direction of movement of the pistons from their normal positions; reservoir check valve means located in said filling passage for permitting flow through said passage only when the pressure in said first cavity exceeds the pressure in said second cavity; and a prefill chamber unloading valve means being located in a second passage interconnecting said reservoir and first cavity and being responsive to the combined pressures of said first and second cavities for permitting flow to said reservoir only after a preselected force acts thereupon.

4. The invention defined in claim 3 wherein said second passage includes a bore extending axially through said prefill piston; said unloading valve being located in said bore and including a check ball biased forwardly towards an annular seat in the bore; said ball having its forward side exposed to prefill chamber pressure and said actuator means including pressure feedback means located between said spool and said ball for transferring pressure forces acting on the forward end of said valve spool to said ball when said valve spool is shifted from said released position.

5. A hydraulic power brake system comprising: a fluid pressure source; a vehicle brake; a reservoir means; a brake control valve means connected to said source, brake and reservoir means and including axially shiftable valve member means selectively shiftable between a normal released condition wherein said brake is connected to said reservoir means and a forwardly shifted active condition wherein said brake is connected to said source; said valve member means including a first valve member having front and rear ends respectively constantly exposed to the fluid pressures at said brake and reservoir means; a return fluid passage means located in said first valve member and fluid-connecting said brake with said reservoir means; said return fluid passage means including an open end located at the rear end of said first valve member along its axis of shifting; said valve member means including a second member selectively shiftable between unseated and seated positions respectively unblocking and blocking said passage open end; and manually shiftable valve actuating means, including pressure modulating means located along the axis of shifting of and rearwardly of said valve member means and being selectively axially shiftable forwardly to contact and seat said second valve member and to then shift said first and second valve members as a unit to said active position; and biasing means urging said valve actuating means to a normal released position, whereby when said valve actuating means is released, said valve member means will be returned to said released position by the brake actuating pressure.

* * * * *